Feb. 21, 1933. M. WINTER 1,898,415
METHOD OF HEATING STEEL FOR HARDENING
Filed Nov. 11, 1930 2 Sheets-Sheet 2
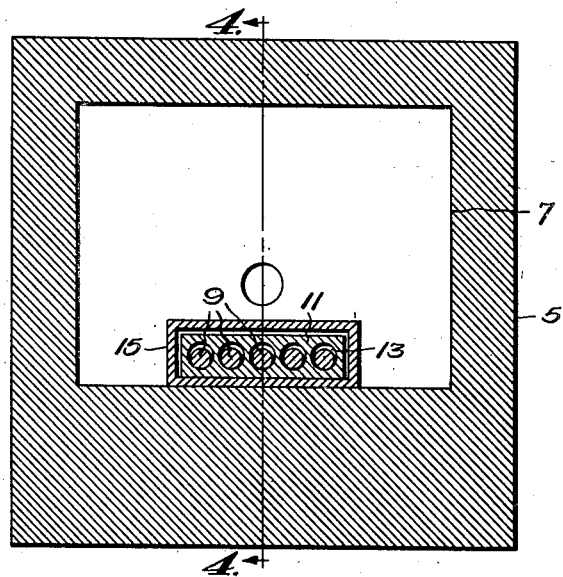
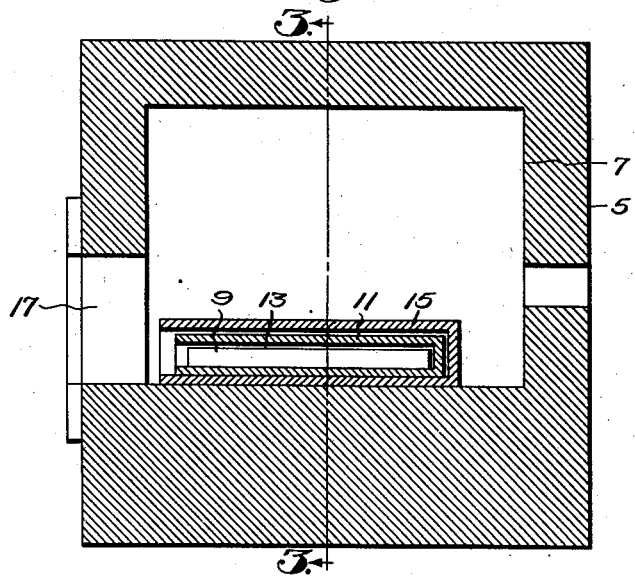
Inventor:
Murray Winter
by Emery, Booth, Varney & Townsend
Attys Patented Feb. 21, 1933

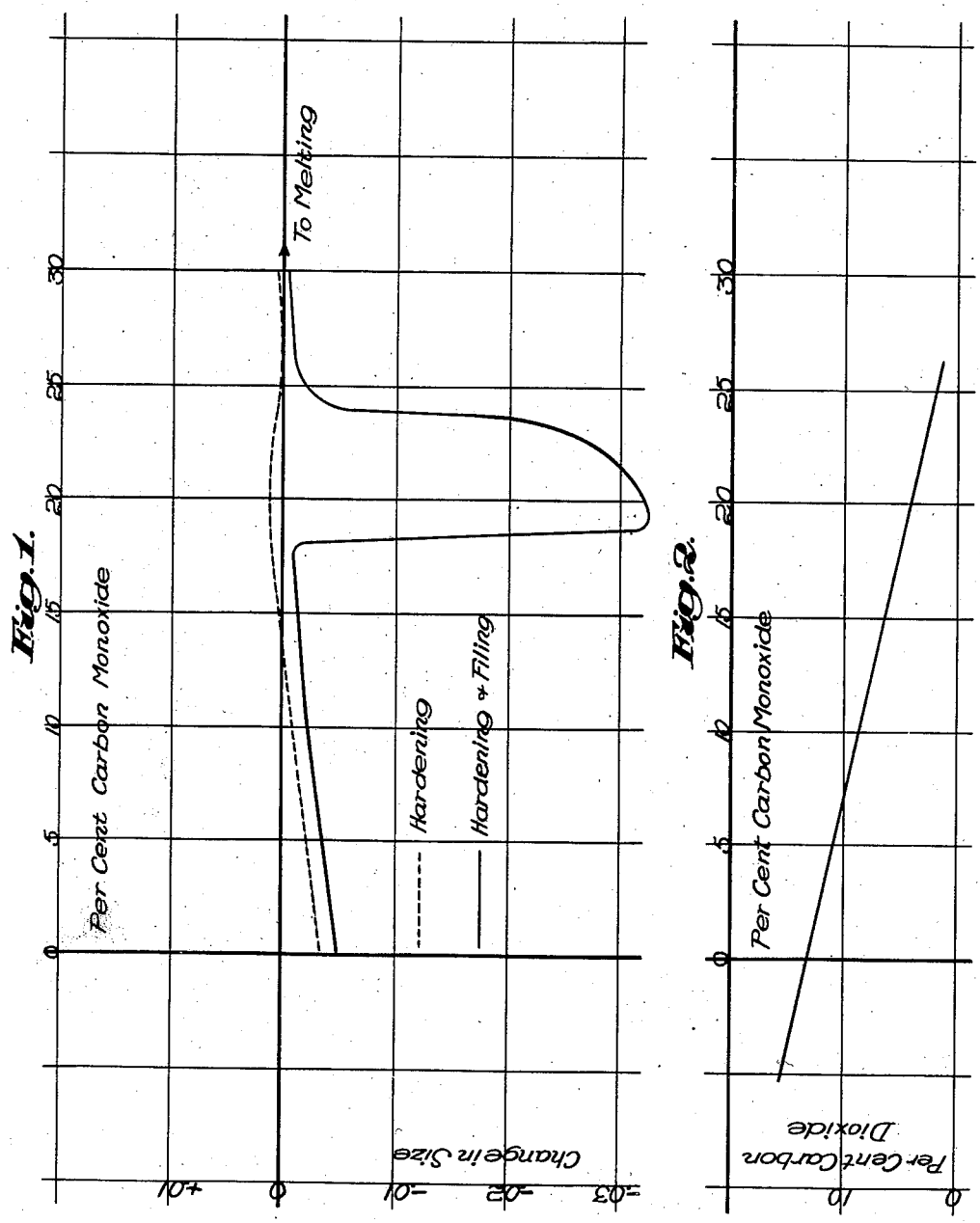

1,898,415

UNITED STATES PATENT OFFICE

MURRAY WINTER, OF WRENTHAM, MASSACHUSETTS, ASSIGNOR, BY MESNE ASSIGNMENTS, TO THE SENTRY COMPANY, OF TAUNTON, MASSACHUSETTS, A CORPORATION OF MASSACHUSETTS

METHOD OF HEATING STEEL FOR HARDENING

Application filed November 11, 1930. Serial No. 494,895.

This invention relates to methods for the heat treatment of steel, and more particularly what is known as high speed steel, incidentally to hardening the same, and has for its object the provision of a method designed to prevent the formation of any substantial oxidizing scale on the steel, while at the same time leaving without substantial change the carbon content of the steel. I herein also disclose means, practically usable under commercial conditions, by which such method may be practiced, this subject matter being specifically claimed in my copending application which has eventuated in Patent No. 1,812,837, June 30, 1931. This application is a continuation in part of said application.

The invention will best be understood by reference to the following description, when taken in connection with the accompanying illustration of one specific embodiment thereof, while its scope will be pointed out more particularly in the appended claims.

In the drawings:

Figs. 1 and 2 are graphs;

Fig. 3 is a cross-sectional elevation taken on the line 3—3 in Fig. 4 through a heating furnace equipped with a container embodying the invention in one of its aspects, and herein suitable for the heat treatment of small, high speed tools, in accordance with the novel method; and Fig. 4 is a longitudinal section in elevation of the furnace shown in Fig. 3, taken on the line 4—4 in Fig. 3.

What is known as "high speed" steel has a low carbon content, the amount of carbon usually approximately $\frac{7}{10}$ of 1%, or thereabouts. Small changes in carbon content substantially alter the properties of the steel. High speed steel also ordinarily contains a substantial proportion of tungsten, varying from 5% to 25%, but commonly approximating 18% or 20%, with this there being frequently alloyed lesser quantities of chromium, vanadium, cobalt or manganese, although the exact constituency of the steel and the proportions of these various metals when present therein are subject to wide variations.

While ordinary carbon tool steel may be hardened at temperatures approximating 1400° F., high speed steel requires substantially higher temperatures, usually in excess of 2000° F., and commonly approximating 2300° F., or thereabouts, which is only slightly under the melting temperature of the steel. Hitherto when the high speed steel was heated at the required temperature, whether in a gas, oil, electric or other furnace, the contact of the air with the heated steel formed an oxidizing scale of substantial depth. After the hardening operation, this scale was removed, introducing an item of substantial expense in the heating and hardening process. In the case of finely dimensioned tools, such as taps, dies, reamers and the like, the scale not only had to be subsequently removed, but had to be previously allowed for in the manufacture of the unhardened tool. Since the depth of the scale is subject to wide variations under slightly different conditions of heat treatment, it was difficult to carry out the heating and hardening operation with any uniformity in respect to the depth of the scale, and frequently difficult to do so within the range of allowable tolerances. If the heating were carelessly done, the depth of the scale might be such as to render the tool useless for its intended purpose.

Various expedients have been proposed to prevent or limit the formation of the scale in hardening high speed steel, but those heretofore employed either have been impracticable for continued use on a commercial scale, or have had a tendency to alter the carbon content of the steel by increasing it and thereby rendering it more brittle or diminishing it and thereby rendering it softer. High speed steel is susceptible to slight changes in the carbon content due to its relatively small amount of carbon. If any substantial amount of carbon is removed, the steel immediately below the surface displays marked soft characteristics. If its carbon content is substantially increased, it becomes brittle.

I have found that these difficulties may be obviated if the steel is heated in a gaseous atmosphere in which the carbon gases maintain a suitable balance between carbonization and decarbonization, and that such a balanced condition is obtained in a gaseous atmosphere containing a large proportion of carbon monoxide, say from 25 to 30 percent, carbon dioxide being present in relatively small amounts, about $\frac{1}{10}$ of the monoxide, and in the absence of other decarbonizing gases.

To graphically indicate the basis of the invention, I have shown in Figs. 1 and 2 graphs illustrative of an exemplary series of experiments, wherein test pieces of high-speed steel were treated under regulated conditions. In these experiments, test pieces of 17% tungsten high-speed steel were used, which were threaded to permit the changes in surface conditions to be more readily detected. These were heated for three minutes at 2350° F., in atmospheres obtained by mixture of illuminating gas and air. The illuminating gas used contained before combustion about 4% carbon dioxide, 34% carbon monoxide, 45% hydrogen, and 14% methane. The dotted line curve in Fig. 1 shows the changes in diameter due to heating, increase being presumably accounted for by changes in crystalline structure and decrease being due to burning away or scaling. The full line curve shows the total change in diameter caused by the heat treatment and subsequent removal of scale or soft surface by careful filing with a file.

Reviewing the results, it will be observed that pieces heat treated in an atmosphere of less than 12% carbon monoxide show considerable scale. The surface was burned considerably to reduce the size. The surface condition of the test pieces materially improved as the gas analysis approached 17% carbon monoxide. Immediately upon passing this point, the worst condition was encountered, and although test pieces showed a beautiful, satin black finish, a soft surface condition was found which persisted until about 25% carbon monoxide. The file easily removed the steel from these pieces to a considerable depth, until a point was reached where the soft surface, showing a contrast to the hard steel below was clearly visible to the eye.

The curves of Fig. 1 show only a part of the range of mixtures of illuminating gas and air investigated in the series of experiments under consideration, as there is a condition at the lower end of the curve where carbon dioxide is present in decreasing quantities, where no carbon monoxide exists due to an excess of oxygen. This condition which cannot be plotted on a carbon monoxide base gives, as would be expected, a decided scaling. Also, in this series of experiments, the maximum carbon monoxide content was limited, and the curve does not show results above 30% carbon monoxide. However, other tests indicate that at somewhat above 30% carbon monoxide, melting would take place. Such melting is probably due to the steel absorbing carbon, with generation of carbon dioxide, and changing its composition sufficiently to reduce its melting point. This further is indicated by actual chemical analysis of commercially satisfactory pieces which, treated in atmospheres containing approximately 30% carbon monoxide, showed a slight increase in the carbon content of the surface after heat treatment.

While I do not wish to be bound to any theory underlying the empirical results, it may be suggested that these results may be interpreted as follows:—

Soft surface is due to decarbonization, or loss of carbon. It appears that a neutral condition is obtained at which the carbon content remains constant at about 25% or 26% carbon dioxide, and this neutral condition varies but slightly to the neighborhood of about 30%. If the atmosphere has substantially more carbon monoxide, then this carbon will flow into the steel, increasing its carbon content. If the atmosphere has less carbon monoxide, some of the carbon in the steel will flow out, producing a soft surface. This raises the question why high-speed steel, heat treated in an atmosphere of less than 17% carbon monoxide, should not lose its carbon and have a soft surface. The best theory offered to explain this is that steel in a low percent of carbon monoxide atmosphere will scale. This scale adheres closely to the steel, and represents a surface change. It would seem that the scale on high-speed steel in some manner serves to seal the surface, and prevent the further loss of carbon.

Similar curves can be produced from atmospheres generated by partial combustion of carbon and graphite.

High speed steel treated in an atmosphere of hydrogen showed a marked soft surface which was probably due to generation of methane at the temperature involved with resultant decarburization. In the case of the illuminating gas mixtures, although hydrogen was initially present, it is to be supposed that, if present in that form during the treatment, the presence of substantial quantities of methane inhibited the reaction. This is borne out by the results of the preceding paragraph, where the gases present were substantially only oxides of carbon and nitrogen. If this explanation is correct, we have an example of a diluent which is itself inert to the reaction, but which permits the balance between the relative amounts of the oxides of carbon present which I have reason to believe determines the neutral condition. It should be recognized, however, that, for example, by the use of certain hydrocarbons, as for instance acetylene, atmospheres may be produced in which compounds other than the oxides may be present in such quantities and combinations as to effect the carbonizing or decarbonizing reactions involved. The curves given, however, obviously cover the conditions to be anticipated in practice, and form a reliable guide for general use for a wide range of conditions.

It will be noted that, while good results are obtained under conditions represented on the curve of Fig. 1 by about 17% carbon monoxide, the point is quite critical. It is my belief that empirical processes in the past have attempted to operate about this critical point, thus causing great difficulties, and that these difficulties are substantially avoided if the range of 25% to 30% carbon monoxide is utilized. Furthermore, if we accept the theory that with the lower percentages scale must be present to prevent soft surface, the increased desirability of the latter atmosphere is evident.

To facilitate the commercial utilization of these principles, I have devised means whereby a neutral or non-oxidizing atmosphere may be maintained about the steel while it is being heated precluding the formation of any substantial scale or limiting it to an immaterial depth by confining the same in a chamber having walls of suitable carbonaceous material so proportioned with respect to the article being treated that a neutral atmosphere will be generated about the article and maintained thereabout in a stagnant condition during the heating operation. The proportion of 25 to 30% carbon monoxide is easily attained. Any material change in the carbon content of the steel is avoided. The process and article are such as to make them adaptable to the hardening of articles of high speed steel on a commercial scale.

Referring to the drawings and to the embodiment of the invention which is there submitted for illustrative purposes, there is shown a conventional form of furnace 5 having a heating chamber 7 within which the necessary range of temperature may be maintained for heating high speed steel incidentally to the hardening of the same.

For heat treating the steel 9, which may be taken by way of example to be drills composed of high speed steel and intended to be hardened, there is provided a protector in the form of a jacket or container comprising the block 11 in which there are drilled a series of holes 13, one for each tool, and providing for each a chamber of slightly greater length than the length of the tool. Each chamber is also of somewhat greater diameter than that of the tool, thereby leaving a small clearance so that the steel pieces may be readily inserted in place or withdrawn after they have been heated by means of a pair of tongs or a "spoon".

The jacket or container is formed of suitable carbonaceous materials substantially infusible at the temperature employed but adapted, presumably by the slow combustion of the inner wall of the chamber adjacent the article being treated, to generate a neutral atmosphere about the tool which atmosphere remains stagnant in the recess and not subject to being swept out by convection currents.

In accordance with the provisions of the statutes, I will state the best method now known to me for manufacturing the container. Preferably I utilize a mixture of soft graphite of the kind commonly employed in the manufacture of dynamo brushes and relatively hard coke carbon, the two materials being thoroughly mixed together and compressed into a hard body relatively imporous in the sense that it prevents any substantial passage of air therethrough under atmospheric pressure. Utilizing materials of the kinds described as obtained commercially on the market, the preferred proportions are from 10% to 30% of graphite and from 90% to 70% of coke carbon. Good results are had with 15% of graphite and 85% of coke carbon. In some instances an excess of graphite tends to increase the carbon content of the steel and render it brittle, while too little graphite, on the other hand, tends to reduce the carbon content leaving the steel soft. Carbonaceous materials, however, vary in practice, and I have in some instances obtained good results with graphite omitted. The example given is therefore not to be considered as a limitation. A simple practical test will determine the adaptability of the material or mixture of materials in any given instance.

As I understand the functioning of the treatment described, when the tool is placed in a recess of the block of material of this nature with a restricted clearance between the tool and the walls of the container, there is no substantial contact which would cause a chemical reaction which would vary the composition of the steel. At the same time, the slight combustion of the interior wall of the chamber generates a neutral atmosphere surrounding the steel which is maintained during the heating process obviating the formation of objectionable scale when subjected to the high temperatures required. Tests indicate that this atmosphere will contain about 30% carbon monoxide.

In the course of time, the intense heat will gradually burn away the material, breaking down the walls or rendering them porous, and when the stage is reached, the worn-out jacket should be discarded and replaced by a new one. The effective life of the container, however, is materially prolonged by surrounding it by a covering of refractory material, minimizing combustion at the exterior surface thereof. For this purpose, there is shown in the drawings a casing 15 enclosing the jacket 11 having its open end extending somewhat beyond the open end of the jacket and both open ends facing the door 17 of the furnace. Any suitable refractory material may be employed for the jacket, such, for example, as alundum. While I have shown a container in the form of a block provided with a plurality of chambers, a form which is convenient for use in simultaneously heat treating and hardening a series of small tools, each piece of steel may be encased in its own separate container, or more than one piece may be inserted in a single chamber, and the size and shape of the chamber and of the container may be varied to adapt it to the particular work to be treated.

In carrying out this process the steel is manipulated in the usual manner. The furnace door being opened, the steel pieces are inserted in the open end of the jacket by means of a spoon or pair of tongs, and the steel then heated for a period of time which will depend on the particular object to be hardened. After a sufficient time has elapsed to bring the steel to the required temperature, the door is again opened and each piece of steel withdrawn from its chamber within the jacket and immediately plunged into the hardening bath.

While I have herein shown and described for the purposes of illustration one specific embodiment of the invention and one particular mode of carrying out the process, it is to be understood that extensive deviations may be made therefrom, all without departing from the spirit thereof.

I claim:

1. A method of heat-treating an article of high-speed steel which comprises heating it to a temperature in the neighborhood of substantially 2300° F. in an atmosphere generated by the incomplete combustion of carbon and containing about twenty-five to thirty percent carbon monoxide and any remaining gases being substantially ineffective to effect oxidation, carbonizing, or decarbonizing of the steel.

2. A method of heat-treating an article of high-speed steel which comprises heating it to a temperature in the neighborhood of substantially 2300° F. in an atmosphere including oxides of carbon, the monoxide being present in amount less than sufficient to cause carbonization and resultant melting and the dioxide in the proportion of not more than one-tenth the monoxide, the oxides constituting at least about twenty-seven percent of the atmosphere and any remaining gases being substantially ineffective to effect oxidation, carbonizing or decarbonizing of the steel.

3. A method of heat-treating an article of high-speed steel which consists in heating it to a temperature in the neighborhood of substantially 2300° F. in the presence of carbon-bearing gases individually tending to carbonize and decarbonize the steel, they being present in relative proportions maintaining an equilibrium between the same and the unoxidized steel, and any remaining gases being substantially ineffective to effect oxidization, carbonizing or decarbonizing of the steel whereby there is provided a neutral atmosphere inhibiting carbonizing or decarbonizing of the steel independent of protective scaling of the same.

4. A method of heat-treating an article of high-speed steel which comprises heating it to a temperature in the neighborhood of substantially 2300° F. in an atmosphere including carbon dioxide, carbon monoxide and an inert diluent, the monoxide present being about ten times the dioxide present and the two being in substantial equilibrium with one another and with the carbon in the steel as regards generation of further monoxide by decarburization of the steel or of further dioxide by carburization of the steel.

5. A method of heat-treating an article of high-speed steel which comprises heating it to a temperature in the neighborhood of substantially 2300° F. in an atmosphere including oxides of carbon the monoxide being about ten times greater in amount than the dioxide and the monoxide constituting at least about twenty-five percent. Of the volume and any remaining gases being substantially ineffective to effect oxidization, carbonizing or decarbonizing of the steel.

6. A method of heat-treating an article of high-speed steel which comprises heating it to a temperature in the neighborhood of substantially 2300° F. in an atmosphere including about twenty-five to thirty percent. carbon monoxide, less than five percent. carbon dioxide and diluting gases in themselves ineffective to effect oxidization, carbonizing or decarbonizing of the steel.

7. A method of heat-treating an article of high speed steel which consists in heating it to a temperature in the neighborhood of substantially 2300° F. while maintaining about the same a neutral atmosphere containing oxides of carbon, the monoxide and dioxide being present in the ratio of about ten to one and any remaining gases being substantially ineffective to effect oxidation, carbonizing or decarbonizing of the steel.

8. A method of heat-treating an article of high-speed steel comprising positioning it with restricted clearances adjacent to substantially impervious walls of substantially infusible carbonaceous material whereby to define a restricted space thereabout in which convection currents are minimized and heating to a temperature of substantially 2300° F. whereby the article is treated in a quiescent atmosphere containing a considerable fraction of carbon monoxide.

9. A method of heat-treating an article of high-speed steel comprising positioning it with its sides and an end thereof closely adjacent to but free of substantial areal contact with a substantially impervious wall consisting of substantially infusible carbonaceous material and heating to a temperature of substantially 2300° F. whereby the article is treated in a quiescent atmosphere containing a considerable fraction of carbon monoxide.

10. A method of heat-treating an article of high-speed steel comprising positioning it adjacent walls arranged to define thereabout a restricted space to retain gases in a quiescent state during the heating process and heating to a temperature in the neighborhood of substantially 2300° F. in the presence of carbonaceous material combustible to maintain in such space an atmosphere containing a considerable fraction of carbon monoxide.

In testimony whereof, I have signed my name to this specification.

MURRAY WINTER.